US012769085B2

(12) United States Patent
Chien et al.

(10) Patent No.: US 12,769,085 B2
(45) Date of Patent: Oct. 20, 2026

(54) DRIVING MECHANISM

(71) Applicant: Actutek Corporation, Taoyuan City (TW)

(72) Inventors: Jui-Ta Chien, Taoyuan City (TW); Chen-Hung Chao, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 209 days.

(21) Appl. No.: 18/764,601

(22) Filed: Jul. 5, 2024

(65) Prior Publication Data

US 2025/0020889 A1 Jan. 16, 2025

Related U.S. Application Data

(60) Provisional application No. 63/513,701, filed on Jul. 14, 2023.

(30) Foreign Application Priority Data

Feb. 28, 2024 (CN) ......................... 202410221528.5

(51) Int. Cl.
*G02B 7/08* (2021.01)
*G02B 27/64* (2006.01)
*G03B 3/10* (2021.01)

(52) U.S. Cl.
CPC ............. *G02B 7/08* (2013.01); *G02B 27/646* (2013.01); *G03B 3/10* (2013.01)

(58) Field of Classification Search
CPC .......... G02B 7/08; G02B 27/646; G02B 7/09; G02B 27/64; G03B 3/10; G03B 2205/0069; G03B 5/00; G03B 13/36; G03B 30/00; H02K 33/00; H02K 33/18; H04N 23/50; H04N 23/67; H04N 23/68
See application file for complete search history.

(56) References Cited

U.S. PATENT DOCUMENTS

2015/0195438 A1* 7/2015 Park ....................... H04N 23/55 348/345
2017/0227783 A1* 8/2017 Hu ........................... G02B 7/08
2018/0338069 A1* 11/2018 Hu ......................... H04N 23/55
2020/0249424 A1* 8/2020 Ho ..................... H02K 41/0356
(Continued)

FOREIGN PATENT DOCUMENTS

CN 219065853 U 5/2023
JP 2006521198 A * 9/2006 ............. G10K 11/16
KR 20190014849 A * 2/2019 ............. G03B 13/36

OTHER PUBLICATIONS

Machine translation of JP 2006521198 A retrieved electronically from PE2E Search Mar. 31, 2026 (Year: 2006).*
(Continued)

*Primary Examiner* — Cara E Rakowski
(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

18 Claims, 8 Drawing Sheets

(56) References Cited

U.S. PATENT DOCUMENTS

2021/0033818 A1* 2/2021 Chen .................. H02K 41/0356

OTHER PUBLICATIONS

Machine translation of KR 20190014849 A retrieved electronically from PE2E Search Mar. 30, 2026 (Year: 2019).*
U.S. Appl. No. 18/504,461 Chao et al. filed Nov. 8, 2023 (Year: 2023).*
U.S. Appl. No. 18/504,488 Chen et al. filed Nov. 8, 2023 (Year: 2023).*
U.S. Appl. No. 18/896,304 Wang et al. filed Sep. 25, 2024 (Year: 2024).*
U.S. Appl. No. 18/792,907 Hu et al. filed Aug. 2, 2024 (Year: 2024).*
U.S. Appl. No. 18/944,397 Fan et al. filed Nov. 12, 2024 (Year: 2024).*
U.S. Appl. No. 18/944,391 Fan et al. filed Nov. 12, 2024 (Year: 2024).*
U.S. Appl. No. 18/945,041 Fan et al. filed Nov. 12, 2024 (Year: 2024).*
U.S. Appl. No. 18/896,083 Wang et al. filed Sep. 25, 2024 (Year: 2024).*
U.S. Appl. No. 18/600,090 Peng et al. filed Mar. 8, 2024 (Year: 2024).*
U.S. Appl. No. 18/937,458 Shen et al. filed Nov. 5, 2024 (Year: 2024).*
U.S. Appl. No. 18/938,911 Fan et al. filed Nov. 6, 2024 (Year: 2024).*
U.S. Appl. No. 18/768,209 Zhuang et al. filed Jul. 10, 2024 (Year: 2024).*
U.S. Appl. No. 18/764,566 Chen et al. filed Jul. 5, 2024 (Year: 2024).*
U.S. Appl. No. 18/944,214 Fan et al. filed Nov. 12, 2024 (Year: 2024).*
U.S. Appl. No. 18/896,162 Wang et al. filed Sep. 25, 2024 (Year: 2024).*
U.S. Appl. No. 18/792,956 Hu et al. filed Aug. 2, 2024 (Year: 2024).*
U.S. Appl. No. 18/593,709 Peng et al. filed Mar. 1, 2024 (Year: 2024).*
U.S. Appl. No. 19/016,642 Chang et al. filed Jan. 10, 2025 (Year: 2025).*
Office Action issued in corresponding CN application No. 20240377015.9 dated Aug. 27, 2024 (1 page).

* cited by examiner

DRIVING MECHANISM

CROSS REFERENCE TO RELATED APPLICATIONS

This application claims the benefit of U.S. Provisional Application No. 63/513,701, filed Jul. 14, 2023, the entirety of which is incorporated by reference herein.

This application claims priority of China Patent Application No. 202410221528.5, filed on Feb. 28, 2024, the entirety of which is incorporated by reference herein.

BACKGROUND OF THE INVENTION

Field of the Invention

The present invention relates to a driving mechanism, and, in particular, to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

Electronic devices usually use several coils and corresponding magnets to adjust the focus of a lens. However, miniaturization of these electronic devices may increase the difficulty of mechanical design, and this may also lead to low reliability and low driving force for moving the lens. Therefore, addressing the aforementioned problems has become a challenge.

BRIEF SUMMARY OF THE INVENTION

An embodiment of the present invention provides a driving mechanism for moving an optical element that has an optical axis. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes an upper spring sheet, wherein the fixed part includes a plastic housing and a base connected to each other, the housing has a top portion, at least a sidewall extending from the top portion toward the base, and a protruding structure protruding from an inner surface of the top portion, wherein the upper spring sheet is affixed to the protruding structure, and a channel is formed between the sidewall and the protruding structure.

In some embodiments, the housing is in a quadrilateral shape and has two protruding structures and four nubs, the nubs extend through the upper spring sheet and define two diagonal lines that intersect at a point offset from the center of the housing when viewed along the optical axis.

In some embodiments, the point is located on the optical axis.

In some embodiments, the driving assembly includes a coil disposed on the movable part and a magnetic element disposed on the housing, and the upper spring sheet is connected between the magnetic element and the protruding structure.

In some embodiments, the driving mechanism further includes a circuit assembly, wherein the base forms a first protrusion and a second protrusion, and each of the first and second protrusions has a restricting structure in contact with the circuit assembly, wherein the circuit assembly is restricted in a predetermined position along the optical axis.

In some embodiments, the base further forms a first column and a second column, the first column is in contact with the circuit assembly, and the circuit assembly is located between the first and second columns along a first axis that is perpendicular to the optical axis.

In some embodiments, the driving mechanism further includes a magnet disposed on the movable part and a magnetic field sensor disposed on the circuit assembly for detecting the displacement of the movable part relative to the fixed part, wherein the distance between the magnetic field sensor and the first column is less than the distance between the magnetic field sensor and the second column.

In some embodiments, the thickness of the second protrusion is greater than the thickness of the first protrusion along a second axis that is perpendicular to the optical axis and the first axis.

In some embodiments, the driving mechanism further includes a magnet disposed on the movable part and a magnetic field sensor disposed on the circuit assembly for detecting the displacement of the movable part relative to the fixed part, wherein the distance between the magnetic field sensor and the second column is longer than the distance between the magnetic field sensor and the first column.

In some embodiments, the driving mechanism further includes a conductive member and a glue, wherein the base forms a first column with the conductive member embedded therein, and the first column forms an opening with the glue disposed therein for adhering the conductive member to the first columns.

In some embodiments, the driving mechanism further includes a lower spring sheet connected between the base and the movable part, wherein the housing forms a plurality of nubs extending through the upper spring sheet, and the base forms a plurality of protrusions extending through the lower spring sheet, wherein the nubs and the protrusions do not overlap when viewed along the optical axis.

In some embodiments, the driving mechanism further includes two wires, wherein the driving assembly includes two coils disposed on the movable part and two magnetic elements affixed to the housing, and two winding posts are formed on the same side of the movable part, wherein the wires are wound around the winding posts and electrically connected to the coils.

In some embodiments, the driving mechanism further includes a circuit assembly, a magnet disposed on the movable part, and a magnetic field sensor disposed on the circuit assembly for detecting the displacement of the movable part relative to the fixed part, wherein the base forms a first column and a second column, and the circuit assembly is in contact with the first column and located between the first and second columns along a first axis that is perpendicular to the optical axis, wherein the distance between the winding posts and the first column is longer than the distance between the magnetic field sensor and the first column.

In some embodiments, one of the wires extends through a gap between the magnet and the movable part, and the wire is closer to the optical axis than the magnet.

In some embodiments, the driving mechanism further includes two lower spring sheets, wherein the two lower spring sheets respectively have a connecting portion, and the connecting portions are located close to the winding posts and electrically connected to the wires.

In some embodiments, each of the connecting portions forms a recess, and the recesses are facing opposite directions.

In some embodiments, at least one of the lower spring sheets forms a slot, and the movable part forms a latch extending through the lower spring sheet, wherein the slot is located between the recess and the latch.

In some embodiments, the housing further has two protruding structures located on opposite sides of the housing.

In some embodiments, the driving mechanism further includes an upper spring sheet, wherein the fixed part includes a plastic housing and a base connected to each other, the housing has a top portion, a plurality of sidewalls extending from the top portion toward the base, and two protruding structures protruding from an inner surface of the top portion, wherein the protruding structures are located on opposite sides of the top portion, the upper spring sheet is disposed on the protruding structures, and two channels are formed between the protruding structures and one of the sidewalls.

In some embodiments, each of the protruding structures forms a nub that extends through the upper spring sheet.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
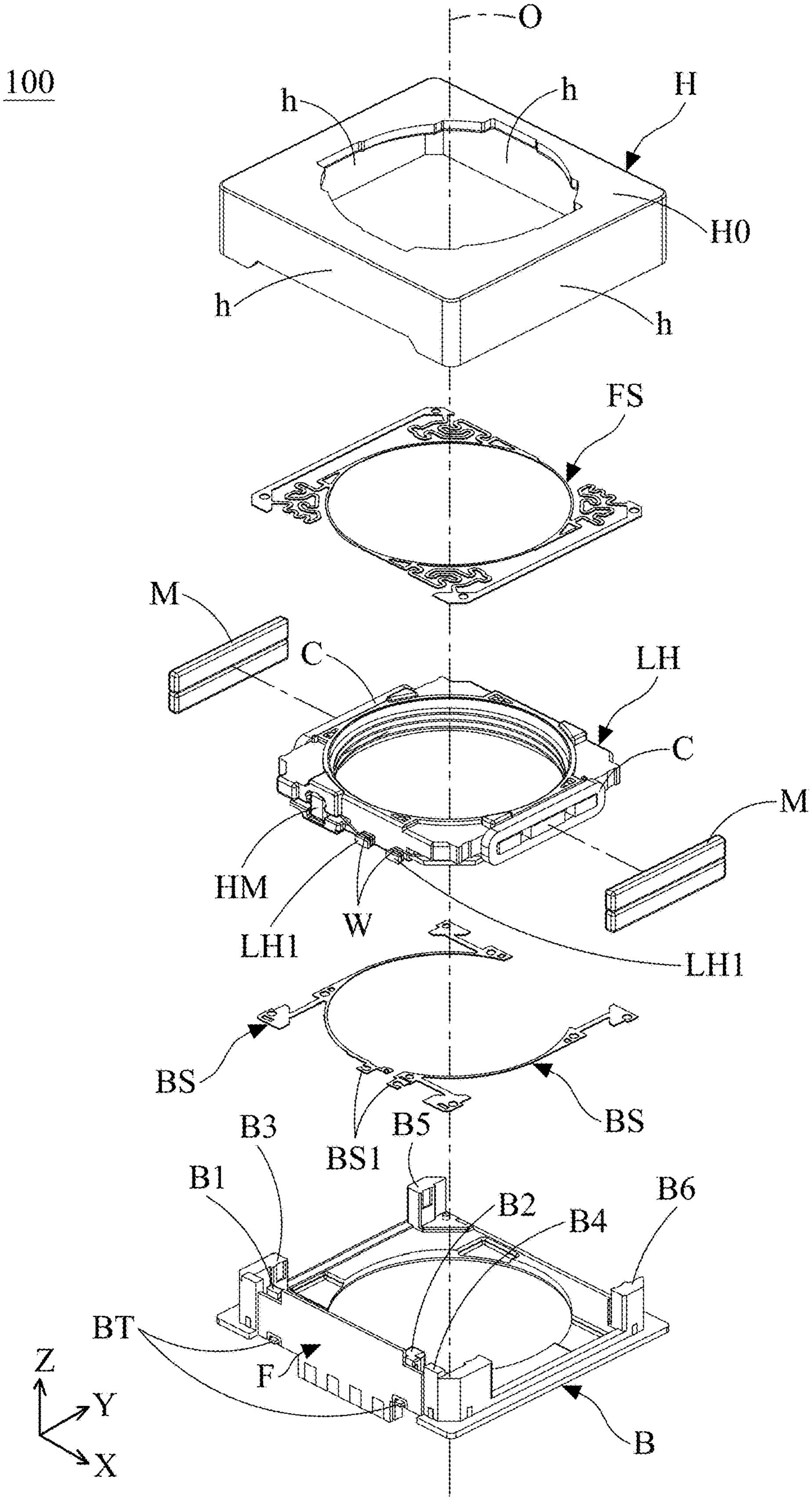
FIG. 1 shows an exploded view of a driving mechanism 100 in accordance with an embodiment of the invention.
Figure 2:
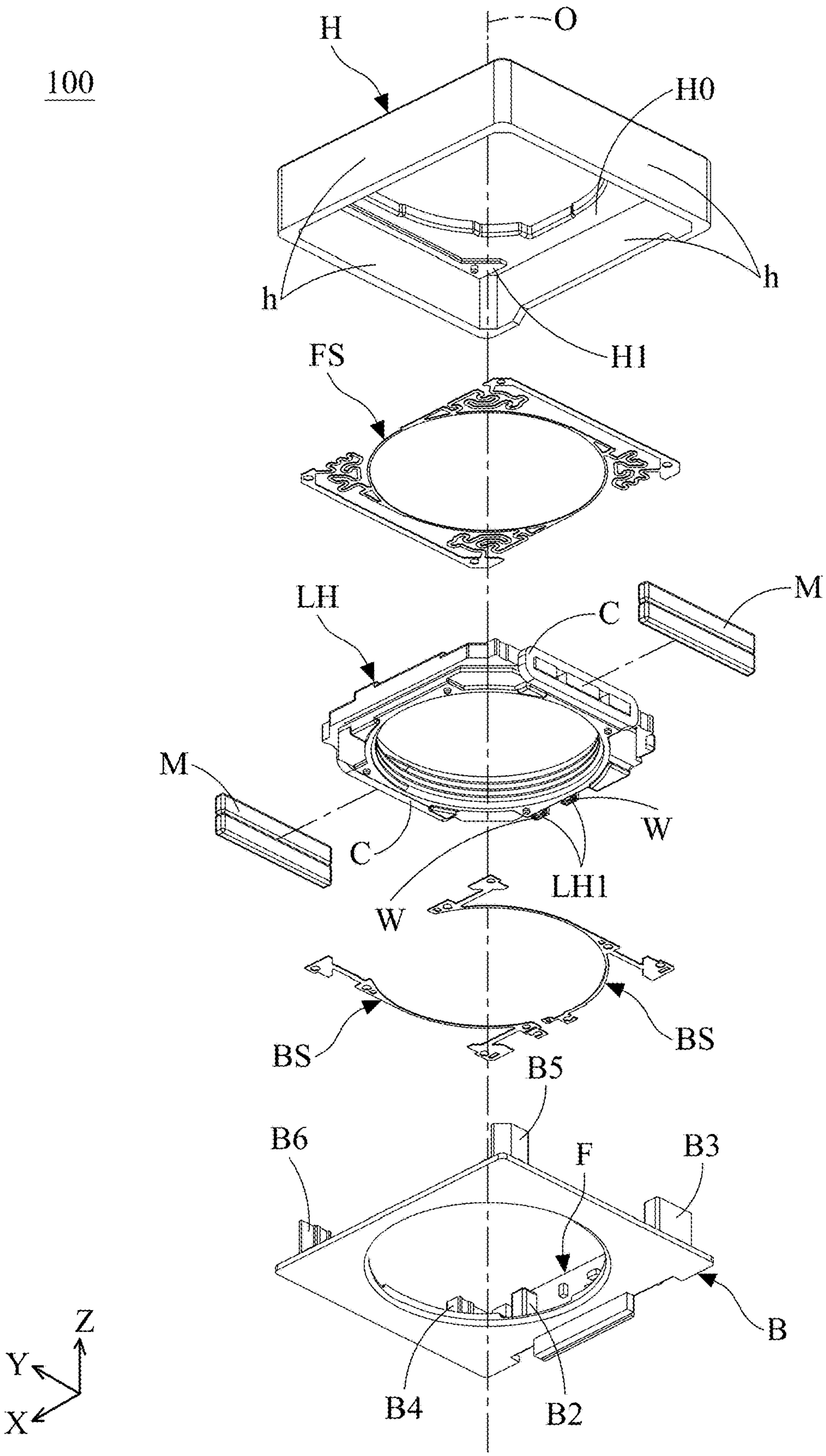
FIG. 2 shows another exploded view of the driving mechanism 100 in FIG. 1.
Figure 3:
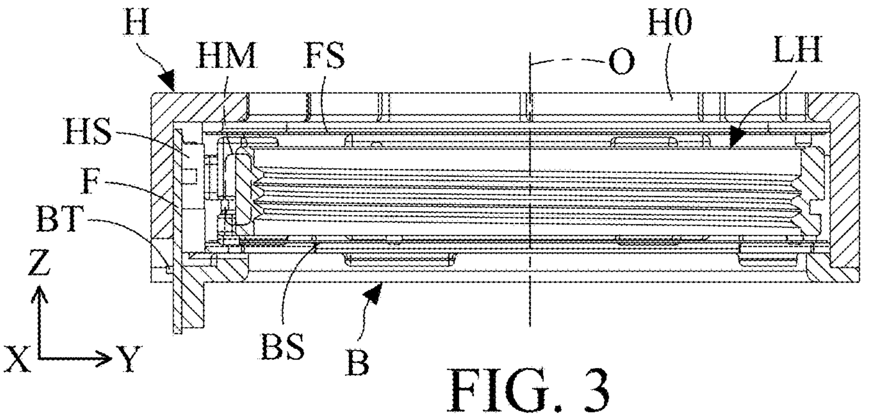
FIG. 3 is a cross-sectional view of the driving mechanism 100 in FIGS. 1 and 2 after assembly.
Figure 4:
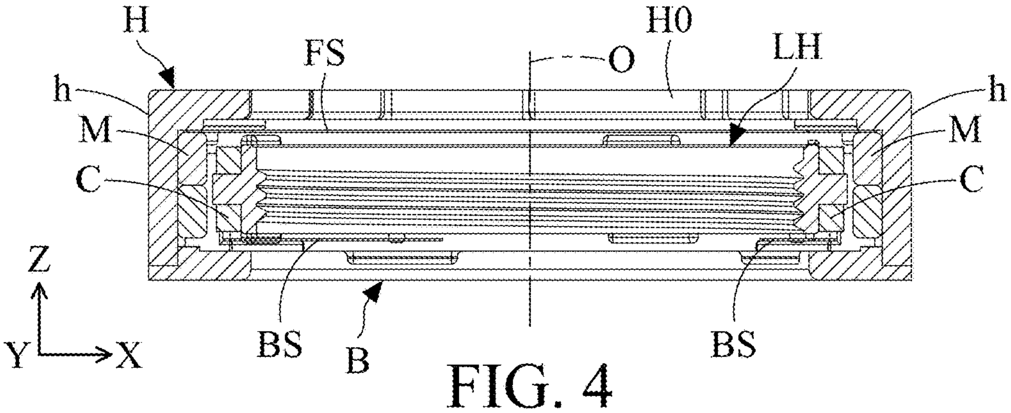
FIG. 4 is another cross-sectional view of the driving mechanism 100 in FIGS. 1 and 2 after assembly.

FIG. 1 shows an exploded view of a driving mechanism 100 in accordance with an embodiment of the invention. FIG. 2 shows another exploded view of the driving mechanism 100 in FIG. 1. FIG. 3 is a cross-sectional view of the driving mechanism 100 in FIGS. 1 and 2 after assembly. FIG. 4 is another cross-sectional view of the driving mechanism 100 in FIGS. 1 and 2 after assembly.

Referring to FIGS. 1-4, the driving mechanism 100 in this embodiment is a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

The driving mechanism 100 primarily comprises a plastic housing H, a plastic base B, a circuit assembly F, a holder LH, an upper spring sheet FS, at least one lower spring sheet BS, at least one magnetic element M, and at least one coil C.

In this embodiment, the housing H has a hollow structure affixed to the base B, and the circuit assembly F is mounted on a side of the base B. Here, the housing H and the base B form a fixed part of the driving mechanism 100. During assembly, the protrusions B1, B2 and the columns B3-B6 of the base B extend into the housing H, and they can be firmly adhered to the inner surface of the housing H by the glue.

The holder LH is movably received in the housing H, and an optical element (not shown) is affixed in the holder LH. The holder LH forms a movable part that is movable relative to the fixed part (the housing H and the base B).

The holder LH is connected to the housing H and the base B via the upper and lower spring sheets FS and BS, so that the holder LH can be suspended within the driving mechanism 100. With the configuration as described above, external light can enter the driving mechanism 100 substantially along the optical axis O of the optical element, and light can propagate through the optical element in the −Z direction to an image sensor (not shown) below the base B to form a digital image.

It should be noted that two oval-shaped coils C are disposed on opposite sides of the holder LH. Moreover, two magnetic elements M (e.g. magnets) are disposed on the inner sides of the housing H and located corresponding to the coils C. The coils C and the magnetic elements M constitute a driving assembly for impelling the movable part (holder LH) relative to the fixed part (the housing H and the base B) along the optical axis O.

When a current signal is applied to the coils C, an electromagnetic force can be generated by the coils C and the magnets M, so that the holder LH and the optical element received therein can be driven to move relative to the fixed part (the housing H and the base B) along the optical axis O (Z direction). Hence, the function of auto-focusing (AF) or Optical Image Stabilization (OIS) can be achieved.

FIGS. 1 and 3 further show a magnet HM is disposed on a side of the holder LH, and a magnetic field sensor HS is disposed on the circuit assembly F. For example, the magnetic field sensor HS may be a Hall effect sensor, MR sensor, or Fluxgate sensor to detect the position variation of the magnet HM, so that the relative movement between the holder LH and the fixed part (the housing H and the base B) can be determined.

Moreover, it can be seen in FIGS. 1 and 3 that two conductive members BT protrude from the base B in the −Y direction. The conductive members BT may be integrally formed with the plastic housing H by insert molding. The ends of the conductive members BT are exposed to the top side of the base B, and the lower spring sheets BS are electrically connected to the conductive members BT by soldering or welding.

Figure 5:
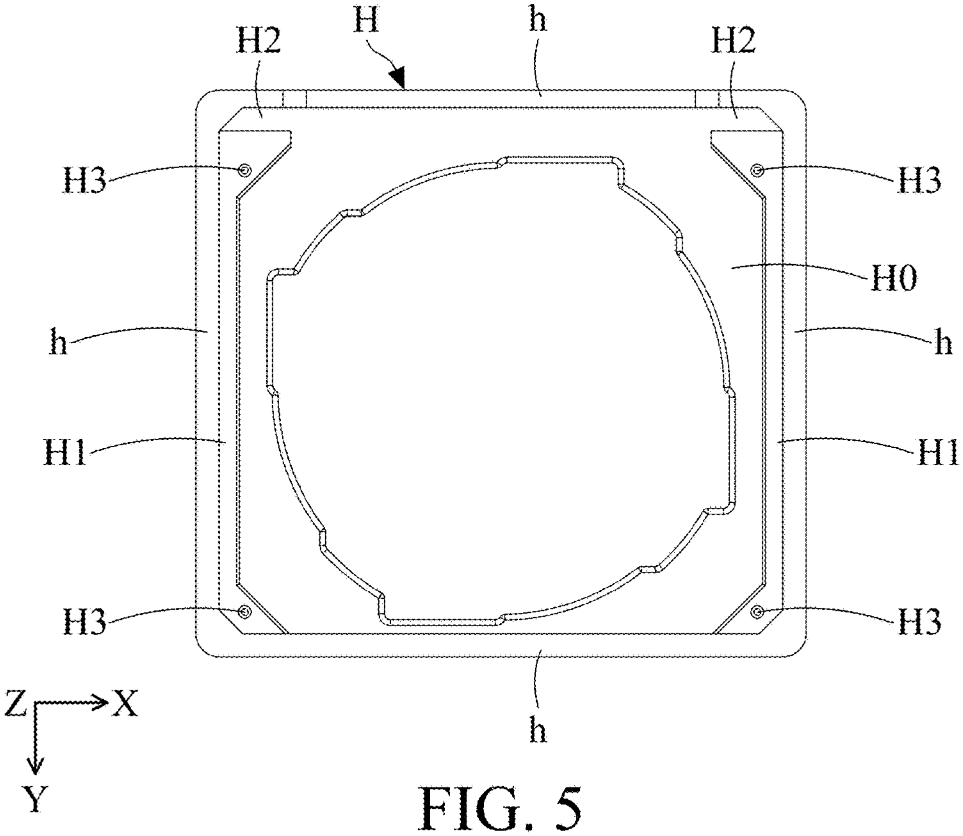
FIG. 5 is a bottom view of the housing H of FIGS. 1-4.
Figure 6:
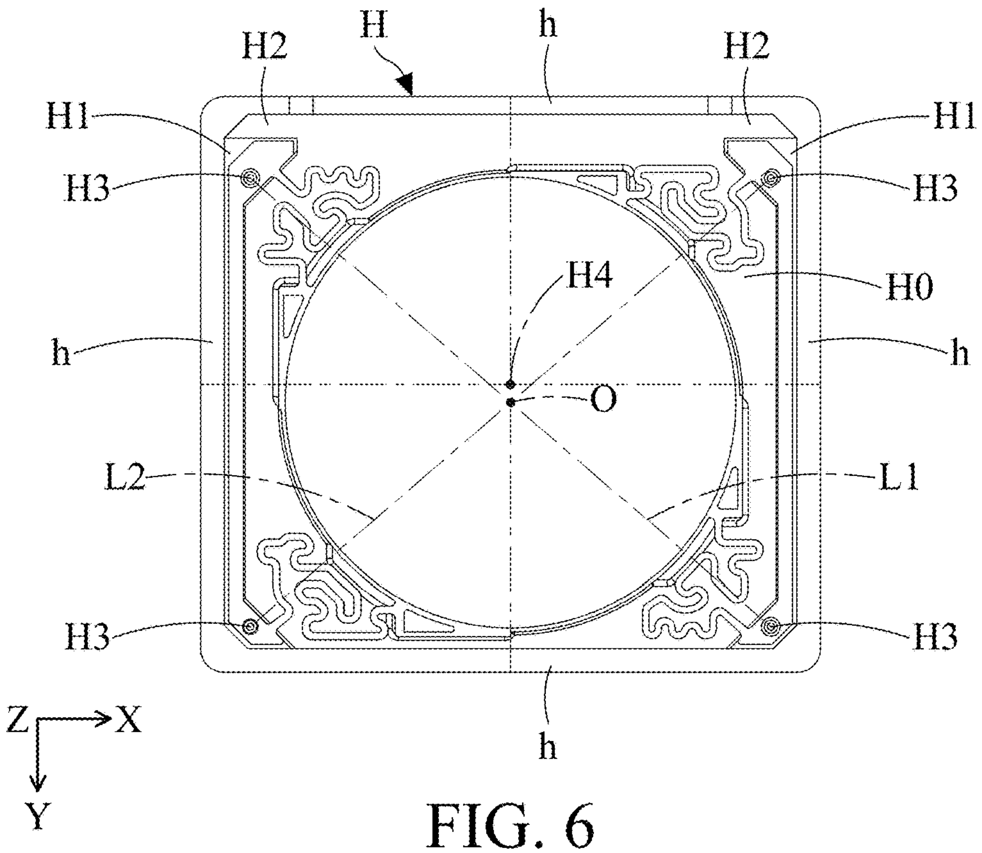
FIG. 6 is a bottom view of the upper spring sheet FS and the housing H after assembly.
Figure 7:
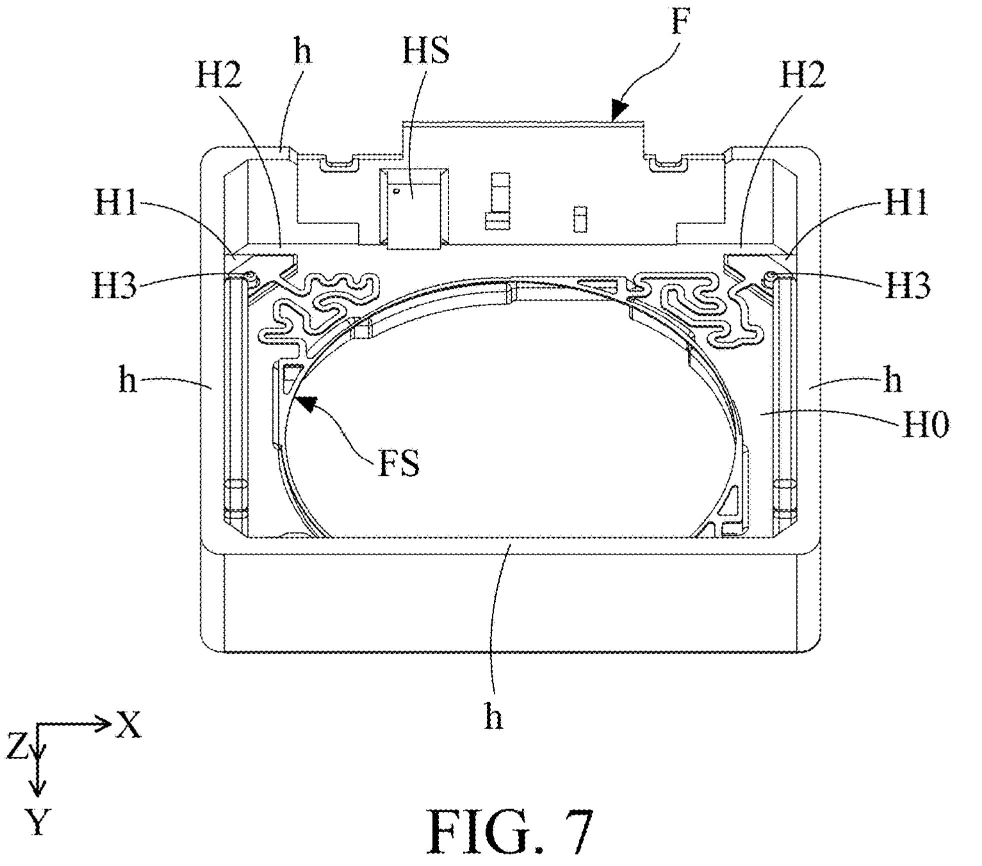
FIG. 7 is a perspective diagram of the magnetic elements M, the circuit assembly F, the upper spring sheet FS, and the housing H after assembly.

FIG. 5 is a bottom view of the housing H of FIGS. 1-4. FIG. 6 is a bottom view of the upper spring sheet FS and the housing H after assembly. FIG. 7 is a perspective diagram of the magnetic elements M, the circuit assembly F, the upper spring sheet FS, and the housing H after assembly.

Referring to FIGS. 1, 2, and 5, the housing H is in a quadrilateral shape, and it has a top portion H0 and four sidewalls h extending from the top portion H0 along the optical axis O toward the base B. Specifically, two longitudinal protruding structures H1 protrude from the inner surface of the top portion H0 toward the base B. The protruding structures H1 extend along two of the sidewalls h that are opposite to each other. As shown in FIG. 5, the channel H2 is formed between each one of the protruding structures H1 and one of the sidewalls h. Moreover, four nubs H3 are formed on the protruding structures H1 that are adjacent to the opposite sidewalls h of the housing H.

It can be seen in FIGS. 6 and 7 that the upper spring sheet FS is mounted on the surfaces of the protruding structures H1, and the nubs H3 are fastened through the upper spring sheet FS. Hence, the four corners of the upper spring sheet FS can be precisely positioned on the top portion H0 of the housing H. During assembly, the magnetic elements M, the upper spring sheet FS, and the housing H can be adhered to each other by the glue, wherein the upper spring sheet FS is connected between the magnetic elements M and the housing H.

In FIG. 6, the four nubs H3 define two diagonal lines L1 and L2 that intersect at a point on the optical axis O. Specifically, the point is offset from the center H4 of the housing H when viewed along the Z axis.

As shown in FIGS. 3 and 7, the circuit assembly F is affixed to one of the sidewalls h and located adjacent to the channels H2 after assembly. It should be noted that the channels H2 are configured to receive the glue, whereby mechanical interference between the solidified glue and the circuit assembly F (or other components inside the housing H) can be efficiently avoided, thus increasing reliability of the driving mechanism 100.

Figure 8:
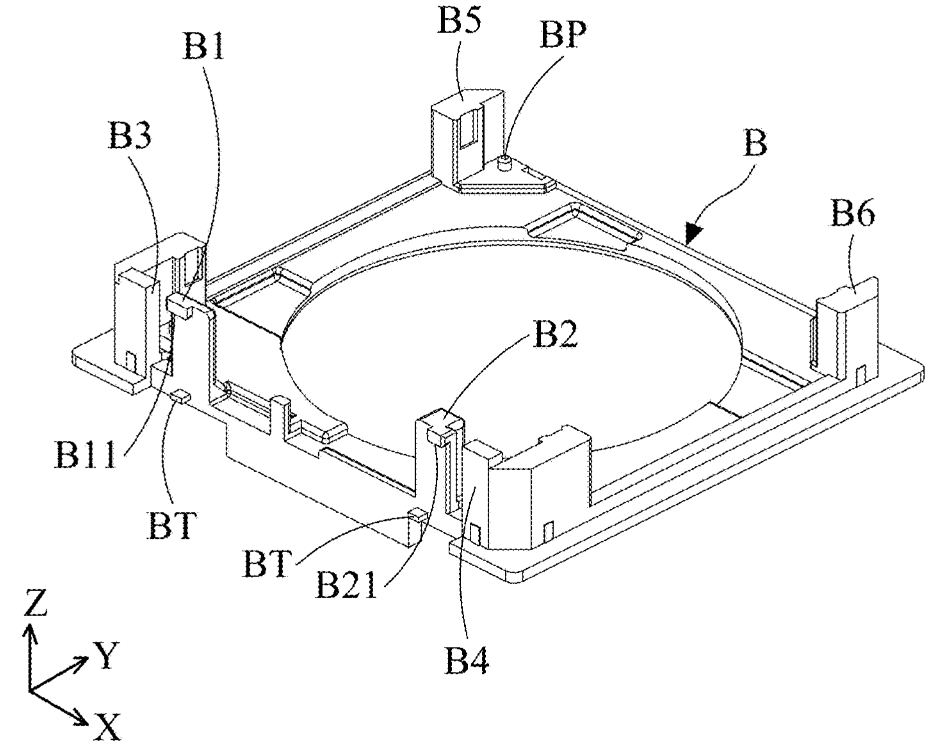
FIG. 8 is a perspective diagram of the base B in FIGS. 1-4.
Figure 9:
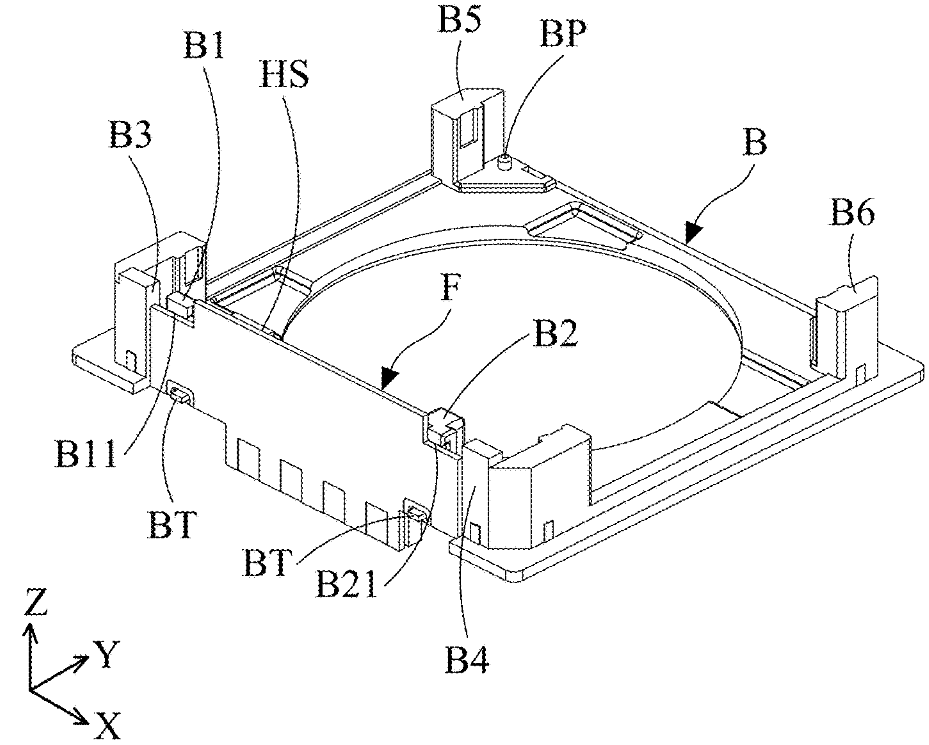
FIG. 9 is a perspective diagram of the base B and the circuit assembly F after assembly.

FIG. 8 is a perspective diagram of the base B in FIGS. 1-4. FIG. 9 is a perspective diagram of the base B and the circuit assembly F after assembly.

Referring to FIGS. 8 and 9, the columns B3-B6 at the four corners of the base B extend in the Z direction. The protrusions B1, B2 are located on the same side of the rectangular base B and between the two columns B3 and B4.

Specifically, the top end of the protrusion B1 (first protrusion) forms a restricting structure B11, and the top end of the protrusion B2 (second protrusion) forms another restricting structure B21. During assembly, the circuit assembly F is positioned between the columns B3 and B4, and the top surface of the circuit assembly F abuts the restricting structures B11 and B21 of the protrusions B1 and B2. Here, the restricting structures B11 and B21 protrude in the −Y direction. When viewed along the optical axis O (Z axis), as the circuit assembly F partially overlaps the restricting structures B11 and B21, it can be precisely aligned in a predetermined position along the optical axis O (Z axis).

In some embodiments, the left side of the circuit assembly F may contact the column B3 so that the circuit assembly F is precisely positioned along the X axis (first axis). When viewed along the optical axis O (Z axis), the distance between the magnetic field sensor HS and the column B3 (first column) is less than the distance between the magnetic field sensor HS and the column B4 (second column).

As the magnetic field sensor HS is closer to the column B3 than the column B4, and the left side of the circuit assembly F abuts the column B3, the magnetic field sensor HS can be precisely positioned and would not be greatly influenced by buckling or bending of the circuit assembly F (e.g. FPC). Therefore, high sensing accuracy of the magnetic field sensor HS can be achieved.

Furthermore, with the conductive members BT protruding from the base B and electrically connected to the conductive terminals on the bottom side of the circuit assembly F, the external circuit can transmit an electrical signal sequentially through the circuit assembly F, the conductive members BT, and the lower spring sheets BS to the coils C on the holder LH.

Figure 10:
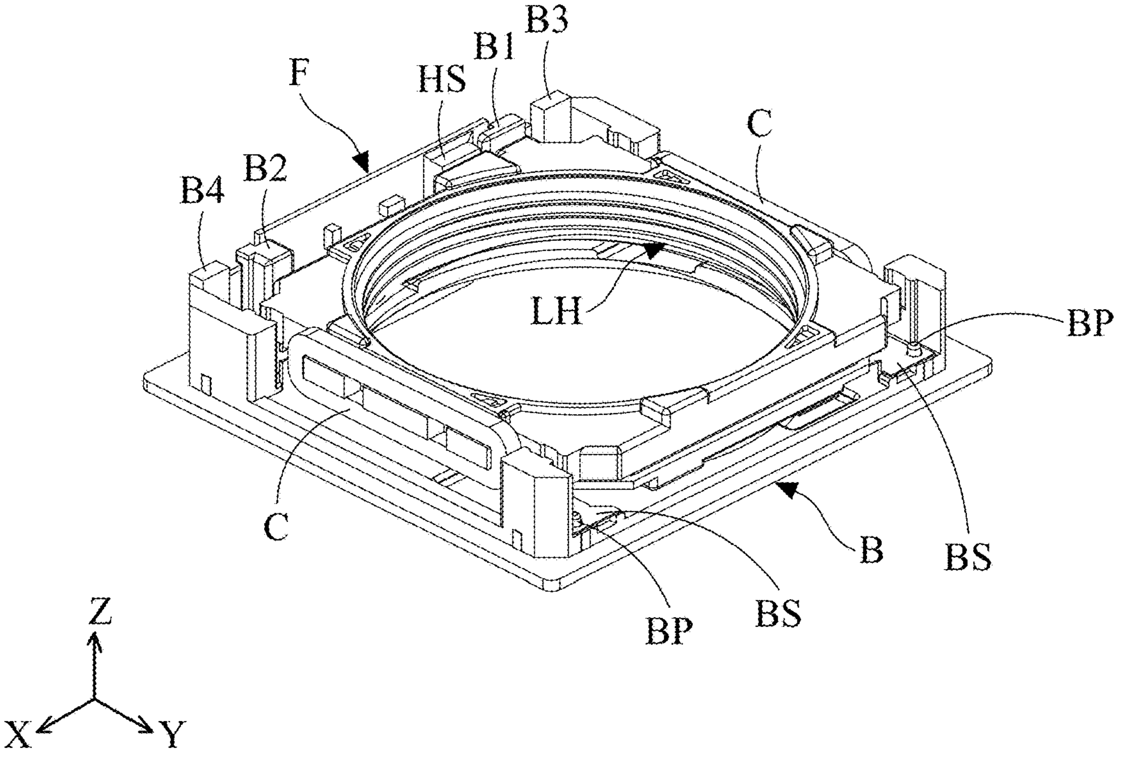
FIG. 10 is a perspective diagram of the coils C and the holder LH received in the base B.
Figure 11:
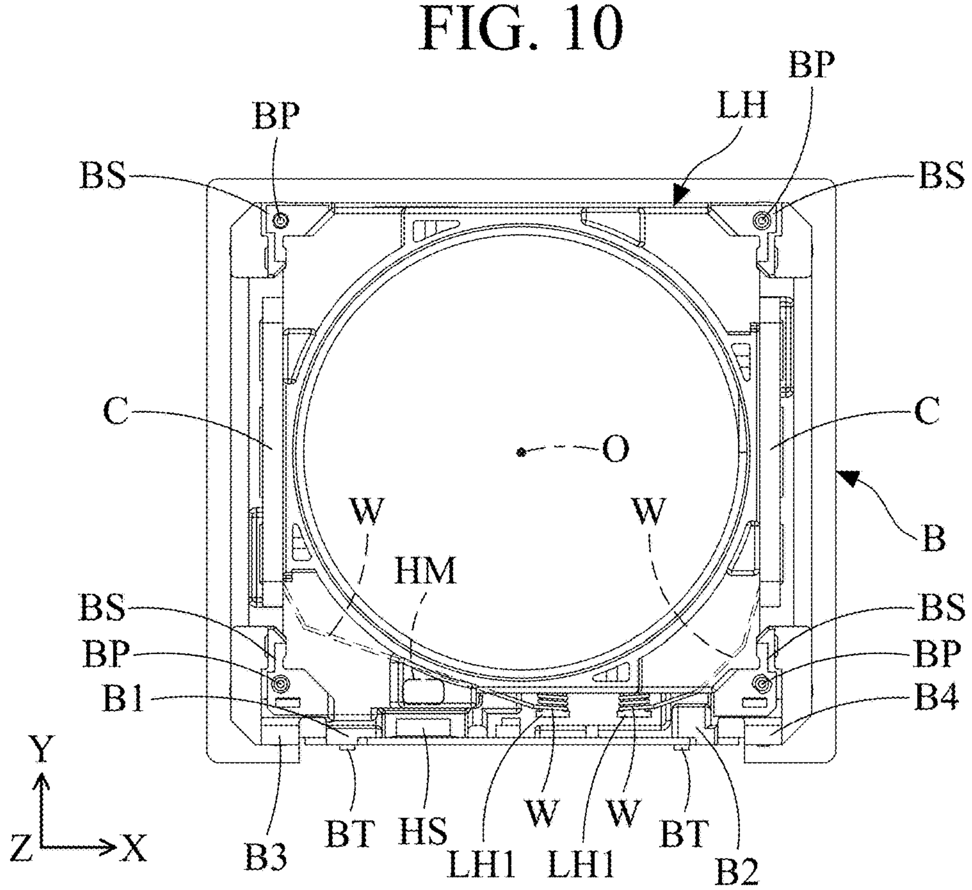
FIG. 11 is a top view of the coils C and the holder LH received in the base B.
Figure 12:
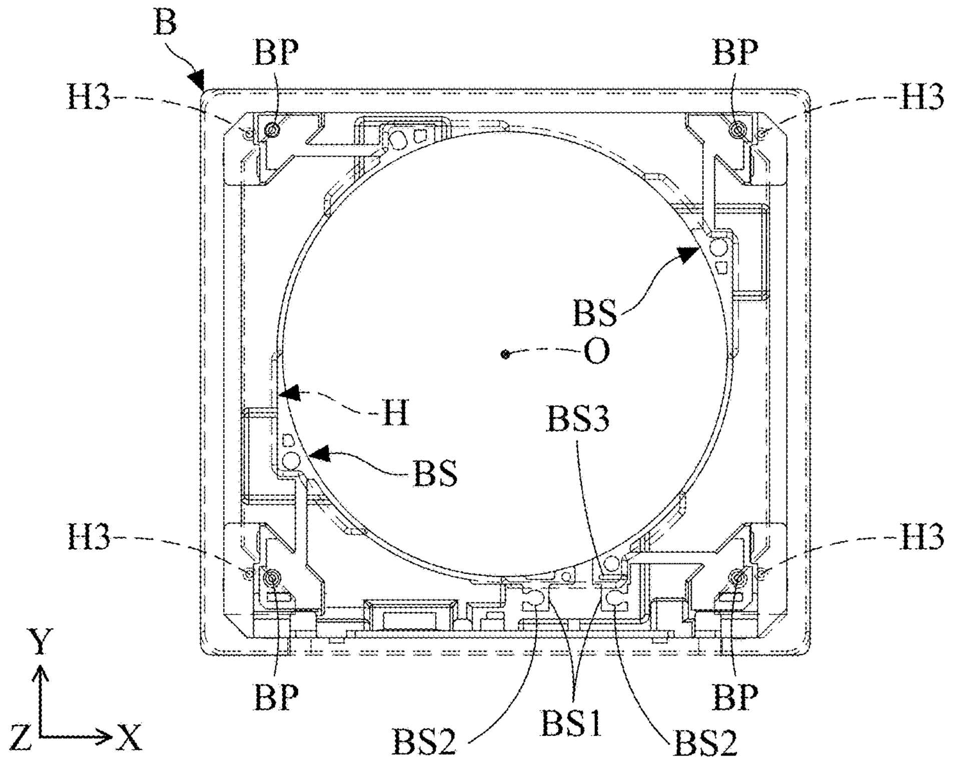
FIG. 12 is a schematic diagram showing that the nubs H3 of the housing H and the protrusions BP of the base B do not overlap when viewed along the optical axis O (Z axis).
Figure 13:
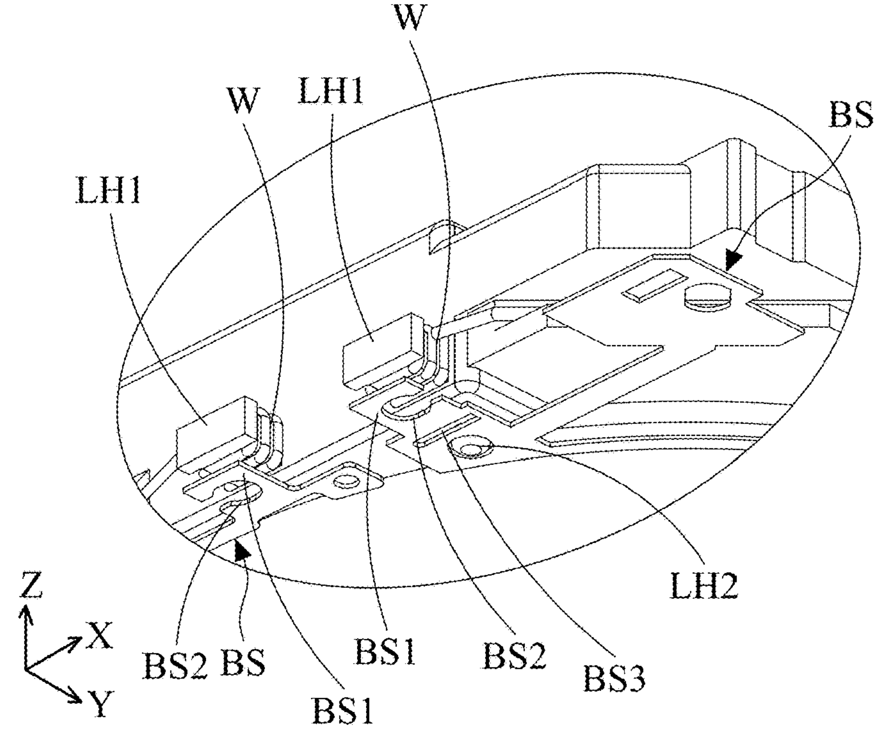
FIG. 13 is an enlarged view of the recesses BS2 formed on the connecting portions BS1.

FIG. 10 is a perspective diagram of the coils C and the holder LH received in the base B. FIG. 11 is a top view of the coils C and the holder LH received in the base B. FIG. 12 is a schematic diagram showing that the nubs H3 of the housing H and the protrusions BP of the base B do not overlap when viewed along the optical axis O (Z axis). FIG. 13 is an enlarged view of the recesses BS2 formed on the connecting portions BS1.

As shown in FIGS. 1, 2, 10, 11, 12, and 13, two winding posts LH1 are formed on the same side of the holder LH and extend toward the circuit assembly F. When viewed along the optical axis O (Z direction), the distance between the winding posts LH1 and the column B3 (first column) is longer than the distance between the magnetic field sensor HS and the column B3 (first column). In this embodiment, two wires W are provided to connect the coils C with the winding posts LH1. During assembly, the wires W wound on the winding posts LH1 are respectively connected to the connecting portions BS1 of the lower spring sheets BS. Therefore, the external circuit can transmit an electrical signal sequentially through the circuit assembly F, the conductive members BT, the lower spring sheets BS, and the wires W to the coils C on the holder LH.

Since the magnetic field sensor HS is located near the column B3, and the winding posts LH1 of the holder LH is located near the column B4, the dimension of the driving mechanism 100 along the Y axis can be efficiently reduced.

In some embodiments, the positions of the magnetic field sensor HS and the winding posts LH1 may be exchanged.

It can be seen in FIGS. 9, 10, 11, and 12 that four protrusions BP are formed at the corners of the rectangular base B. The protrusions BP are fastened through the lower spring sheets BS so that the lower spring sheets BS are precisely positioned within the base B. It should be noted that the nubs H3 of the housing H and the protrusions BP of the base B in FIG. 12 do not overlap when viewed along the optical axis O (Z axis).

Furthermore, FIGS. 11, 12, and 13 show that two connecting portions BS1 of the lower spring sheets BS are located on the same side of the base B and adjacent to the winding posts LH1. Each connecting portion BS1 forms a recess BS2, and the recesses BS2 of the connecting portions BS1 face opposite directions. Therefore, defective bonding between the connecting portions BS1 and the wires W can be clearly observed from the outside of the driving mechanism 100, whereby fast and easy defect inspection during assembly can be achieved.

As shown in FIG. 11, the wire W wound on the left winding post LH1 of the holder LH extends through the gap between the magnet HM and the holder LH to the coil C. In this embodiment, the wire W is closer to the optical axis O than the magnet HM. With the configuration of the wire W, the magnet HM, and the holder LH, the length of the wire W can be efficiently reduced, thereby simplifying the assembly processes and saving production cost.

In this embodiment, the distance between the magnetic field sensor HS and the protrusion B2 (second protrusion) is longer than the distance between the magnetic field sensor HS and the protrusion B1 (first protrusion). Moreover, the thickness of the protrusion B2 (second protrusion) along the Y axis (second axis) is greater than the thickness of the protrusion B1 (first protrusion) along the Y axis.

When an external force is applied to the driving mechanism 100, the protrusions B1 and B2 of the base B can be used as a stopper to contact the holder LH, whereby the circuit assembly F can be prevented from being directly impacted and damaged by the holder LH.

In FIG. 13, a latch LH2 is formed on the bottom side of the holder LH and extend through the lower spring sheet BS. During assembly, the glue is disposed around the latch LH2 so that the holder LH and the lower spring sheet BS are affixed to each other.

Additionally, the lower spring sheet BS forms a slot BS3 located between the recess BS2 and the latch LH2, whereby heat generated by the wire W and the lower spring sheet BS during soldering or welding process can be prevented from transferring to the glue around the latch LH2. Thus, the lower spring sheet BS would not be separated from the holder LH due to melting of the glue.

Figure 14:
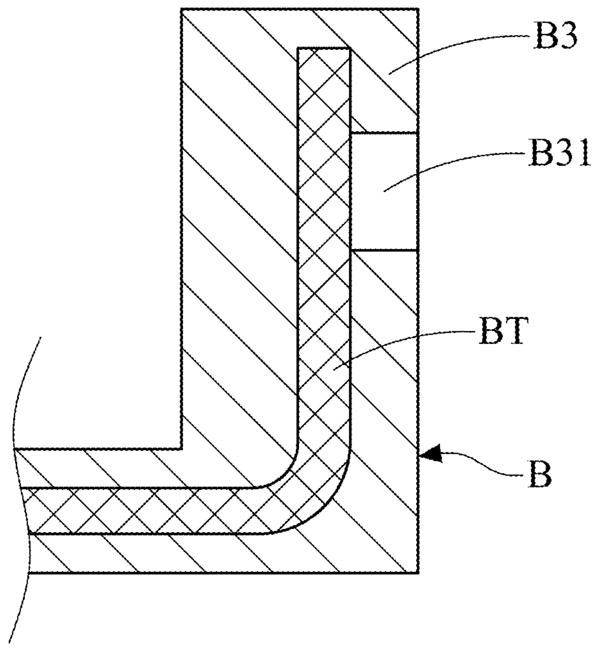
FIG. 14 is an enlarged partial cross-sectional view showing the conductive member BT embedded in the column B3 (first column) of the base B.

FIG. 14 is an enlarged partial cross-sectional view showing the conductive member BT embedded in the column B3 (first column) of the base B.

As shown in FIG. 14, the conductive member BT is integrally formed with the base B in one piece by insert molding. A part of the conductive member BT is embedded into the column B3 (first column) of the base B, thus enhancing the structural strength of the column B3.

It should be noted that an opening B31 is formed on a lateral side of the column B3. The glue can be applied in the opening B31 to firmly connect the conductive member BT with the base B.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element that has an optical axis, the driving mechanism comprising:

a fixed part, including a quadrilateral plastic housing and a base connected to each other, wherein the housing has a top portion, at least a sidewall extending from the top portion toward the base, a protruding structure protruding from an inner surface of the top portion, and a nub extending form the protruding structure toward the base;

a movable part, movably connected to the fixed part for holding the optical element;

an upper spring sheet, affixed to the protruding structure, wherein a channel is formed between the sidewall and the protruding structure and located at a corner of the housing; and a driving assembly, configured for moving the movable part relative to the fixed part, wherein the protruding structure has a longitudinal shape extending along a long axis that is perpendicular to the optical axis, and the nub extends through the upper spring sheet.

2. The driving mechanism as claimed in claim 1, wherein the housing has two protruding structures and four nubs, the nubs extend through the upper spring sheet and define two diagonal lines that intersect at a point offset from the center of the housing when viewed along the optical axis.

3. The driving mechanism as claimed in claim 2, wherein the point is located on the optical axis.

4. The driving mechanism as claimed in claim 1, wherein the driving assembly includes a coil disposed on the movable part and a magnetic element disposed on the housing, and the upper spring sheet is connected between the magnetic element and the protruding structure.

5. The driving mechanism as claimed in claim 1, further comprising a circuit assembly, wherein the base forms a first protrusion and a second protrusion, and each of the first and second protrusions has a restricting structure in contact with the circuit assembly, wherein the circuit assembly is restricted in a predetermined position along the optical axis.

6. The driving mechanism as claimed in claim 5, wherein the base further forms a first column and a second column, the first column is in contact with the circuit assembly, and the circuit assembly is located between the first and second columns along a first axis that is perpendicular to the optical axis.

7. The driving mechanism as claimed in claim 6, further comprising a magnet disposed on the movable part and a magnetic field sensor disposed on the circuit assembly for detecting the displacement of the movable part relative to the fixed part, wherein the distance between the magnetic field sensor and the first column is less than the distance between the magnetic field sensor and the second column.

8. The driving mechanism as claimed in claim 6, wherein the thickness of the second protrusion is greater than the thickness of the first protrusion along a second axis that is perpendicular to the optical axis and the first axis.

9. The driving mechanism as claimed in claim 8, further comprising a magnet disposed on the movable part and a magnetic field sensor disposed on the circuit assembly for detecting the displacement of the movable part relative to the fixed part, wherein the distance between the magnetic field sensor and the second column is longer than the distance between the magnetic field sensor and the first column.

10. The driving mechanism as claimed in claim 1, further comprising a conductive member and a glue, wherein the base forms a first column with the conductive member embedded therein, and the first column forms an opening with the glue disposed therein for adhering the conductive member to the first columns.

11. The driving mechanism as claimed in claim 1, further comprising a lower spring sheet connected between the base and the movable part, wherein the housing forms a plurality of nubs extending through the upper spring sheet, and the base forms a plurality of protrusions extending through the lower spring sheet, wherein the nubs and the protrusions do not overlap when viewed along the optical axis.

12. The driving mechanism as claimed in claim 1, further comprising two wires, wherein the driving assembly includes two coils disposed on the movable part and two magnetic elements affixed to the housing, and two winding posts are formed on the same side of the movable part, wherein the wires are wound around the winding posts and electrically connected to the coils respectively.

13. The driving mechanism as claimed in claim 12, further comprising a circuit assembly, a magnet disposed on the movable part, and a magnetic field sensor disposed on the circuit assembly for detecting the displacement of the movable part relative to the fixed part, wherein the base forms a first column and a second column, and the circuit assembly is in contact with the first column and located between the first and second columns along a first axis that is perpendicular to the optical axis, wherein the distance between the winding posts and the first column is longer than the distance between the magnetic field sensor and the first column.

14. The driving mechanism as claimed in claim 13, wherein one of the wires extends through a gap between the magnet and the movable part, and the wire is closer to the optical axis than the magnet.

15. The driving mechanism as claimed in claim 12, further comprising two lower spring sheets connected to the base and the movable part, wherein the two lower spring sheets respectively have a connecting portion, and the connecting portions are located close to the winding posts and electrically connected to the wires respectively.

16. The driving mechanism as claimed in claim 15, wherein each of the connecting portions forms a recess, and the recesses are facing opposite directions.

17. The driving mechanism as claimed in claim 16, wherein at least one of the lower spring sheets forms a slot, and the movable part forms a latch extending through the lower spring sheet, wherein the slot is located between the recess and the latch.

18. The driving mechanism as claimed in claim 1, wherein the housing further has two protruding structures located on opposite sides of the housing.

* * * * *